United States Patent [19]

Bennett et al.

[11] 4,260,063

[45] Apr. 7, 1981

[54] APPARATUS FOR HANGING AN ARTICLE

[75] Inventors: Aubrey Bennett, Liphook; Lachlan D. C. Macneal, Haslemere; James S. Sinclair, Bordon, all of England

[73] Assignee: B.C.M.S. Engineering & Exhibitions Ltd., England

[21] Appl. No.: 905,722

[22] Filed: May 15, 1978

[30] Foreign Application Priority Data

May 31, 1977 [GB] United Kingdom .................. 188/77

[51] Int. Cl.[3] ...................... E05B 73/00; A47J 51/094

[52] U.S. Cl. ............................................ 211/4; 70/59; 211/124; 223/92

[58] Field of Search ....................... 211/4, 7, 8, 9, 123, 211/124; 70/59, 62; 223/85, 92, 93

[56] References Cited

U.S. PATENT DOCUMENTS

| | | | |
|---|---|---|---|
| 862,505 | 8/1907 | Perrin | 211/8 |
| 1,695,517 | 12/1928 | Waldbauer | 211/8 X |
| 1,713,621 | 5/1929 | Price | 223/92 |
| 2,460,997 | 2/1949 | Myers | 211/123 |
| 3,014,593 | 12/1961 | Risely et al. | 211/4 |
| 3,568,479 | 3/1971 | Fleck et al. | 211/4 X |
| 3,606,948 | 9/1971 | Strang | 211/4 |
| 3,966,100 | 6/1976 | Nelson | 211/4 X |
| 4,069,919 | 1/1978 | Fernbaugh | 211/4 |
| 4,073,415 | 2/1978 | Pegg | 223/92 |
| 4,088,228 | 5/1978 | Schwalbe | 211/4 |

FOREIGN PATENT DOCUMENTS

| | | | |
|---|---|---|---|
| 447761 | 4/1948 | Canada | 223/92 |
| 50903 | 3/1919 | Sweden | 70/59 |
| 175913 | 7/1961 | Sweden | 211/123 |
| 265154 | 11/1949 | Switzerland | 211/123 |
| 1377668 | 12/1974 | United Kingdom | 223/92 |

*Primary Examiner*—Thomas J. Holko

*Attorney, Agent, or Firm*—Ostrolenk, Faber, Gerb & Soffen

[57] ABSTRACT

This invention relates to apparatus for hanging an article having an aperture therein, such as a garment having a sleeve.

According to the invention there is provided a carrier for carrying the article, an elongate flexible member suspended at one end portion thereof from the carrier and securing means for securing together the carrier and an end portion of the flexible member. The arrangement is such that when an article is carried by the carrier with the flexible member threaded through the sleeve thereof and with the securing means securing together the carrier and the flexible member, the article is restrained from being removed from the carrier. The carrier may be used with a stand having a blocking bar for presenting removal of a carrier supported therefrom or the carrier may be provided with a hook for mounting on a stand.

8 Claims, 9 Drawing Figures

APPARATUS FOR HANGING AN ARTICLE

Figure 1:
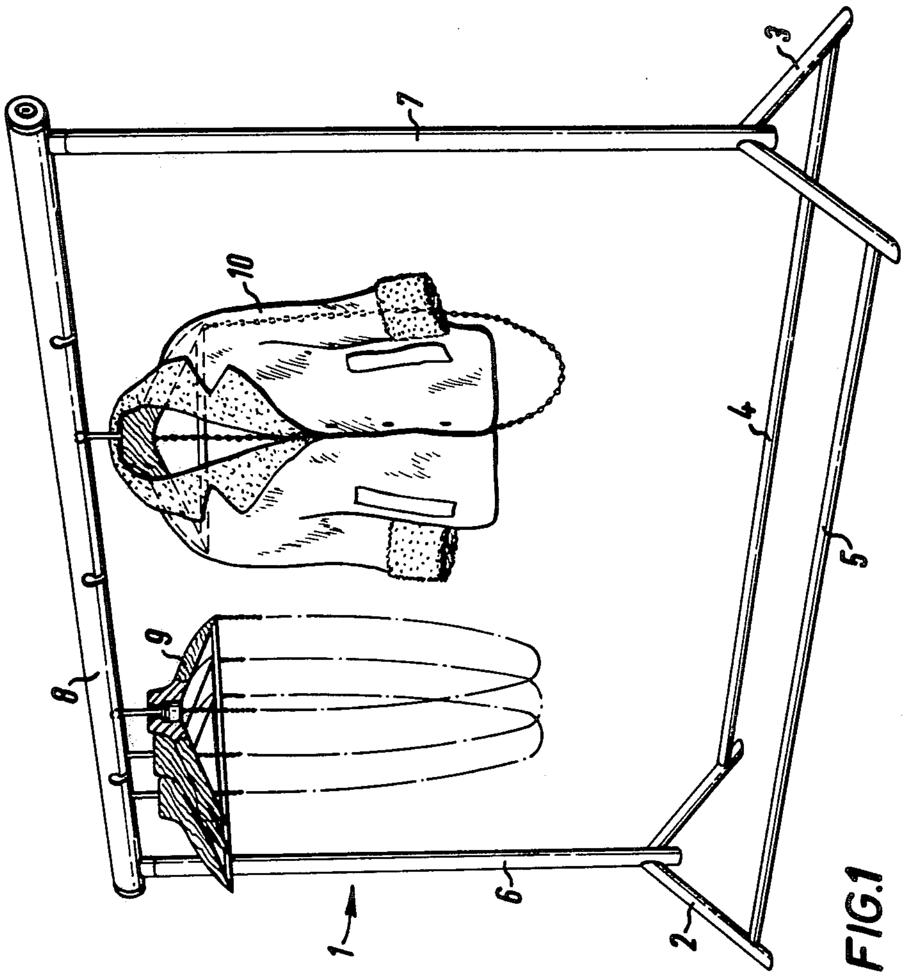

This invention relates to apparatus for hanging an article and particularly apparatus for use in the display and retailing of articles and for restraining pilfering thereof.

In the retail trade it is common practice to suspend garments on hangers and mount the hangers on a frame to display the garments. In this manner, prospective purchasers are invited to examine the garments by removing the garments from the hangers, or by removing the hangers with the garments still supported thereon, and if not satisfied to replace the garments so that they are again suspended from hangers mounted on the frame.

In the case of expensive garments, such as fur coats it is necessary to provide a security device to insure that the garments are not removed from a display without authorisation. One type of security device is a chain, one end of which is irremovably secured to the frame and the other end of which is provided with locking means for removably securing that other end of the chain to the frame.

A disadvantage of such a security device is that it is often necessary to remove the chain from a number of garments in order that a selected garment can be removed from a suspended position in the frame. In such a case, the security of the garments is put at risk once an end of the chain is disconnected from the frame.

In the case of less expensive garments it is common practice in the retail trade to suspend garments for sale on hangers which are supported on a support member of a display unit and not to use a security device. Such a system has the advantage in that customers have freedom to inspect the merchandise offered by retailers without the necessity of requesting assistance from a representative of the retailer, but the freedom is provided at the expense of a reduction in security because removal of hangers with garments supported thereon can be carried out undetected.

According to the present invention, there is provided apparatus for hangering an article having an aperture therein, the apparatus comprising:

a carrier for carrying the article, an elongate flexible member suspended at one end portion thereof from the carrier, securing means for securing together said carrier and an end portion of the flexible member remote from said one end portion thereof, so that when the article is carried by the carrier with the flexible member threaded through said aperture thereof and with said securing means securing together the carrier and the said end portion of the flexible member, the article is restrained from being removed from the carrier. The securing means may comprise a plug and socket combination. The plug may be attached to the flexible member and may be provided with abutment means. The abutment means may be adapted to be received in a recess of a support member for suspending the carrier therefrom. The support member may be provided with movable means for moving into a path of the abutment means to prevent withdrawal of the abutment means from the recess. Movement of the movable means may be controlled by control means. The support member may be a tube and the recess may be a slot extending in a circumferential direction of the tube. The movable means may comprise an elongate plate extending longitudinally of the tube. The plate may be pivotally mounted in the tube on an axis extending longitudinally thereof. The plate may be provided with a lever for pivoting the plate on the said axis. The support member may be mounted on a stand. The apparatus may be provided with a plurality of recesses. The plug may be alternatively provided with movable means adapted to be moved relative to the plug and the socket may be provided with abutment means adapted to be engaged by the movable means to retain the plug in the socket and movement of the movable means may be controlled by control means. The control means may comprise a key operated lock mechanism.

Following is a description, by way of example only and with reference to the accompanying drawings of embodiments in accordance with the present invention.

Figure 2:
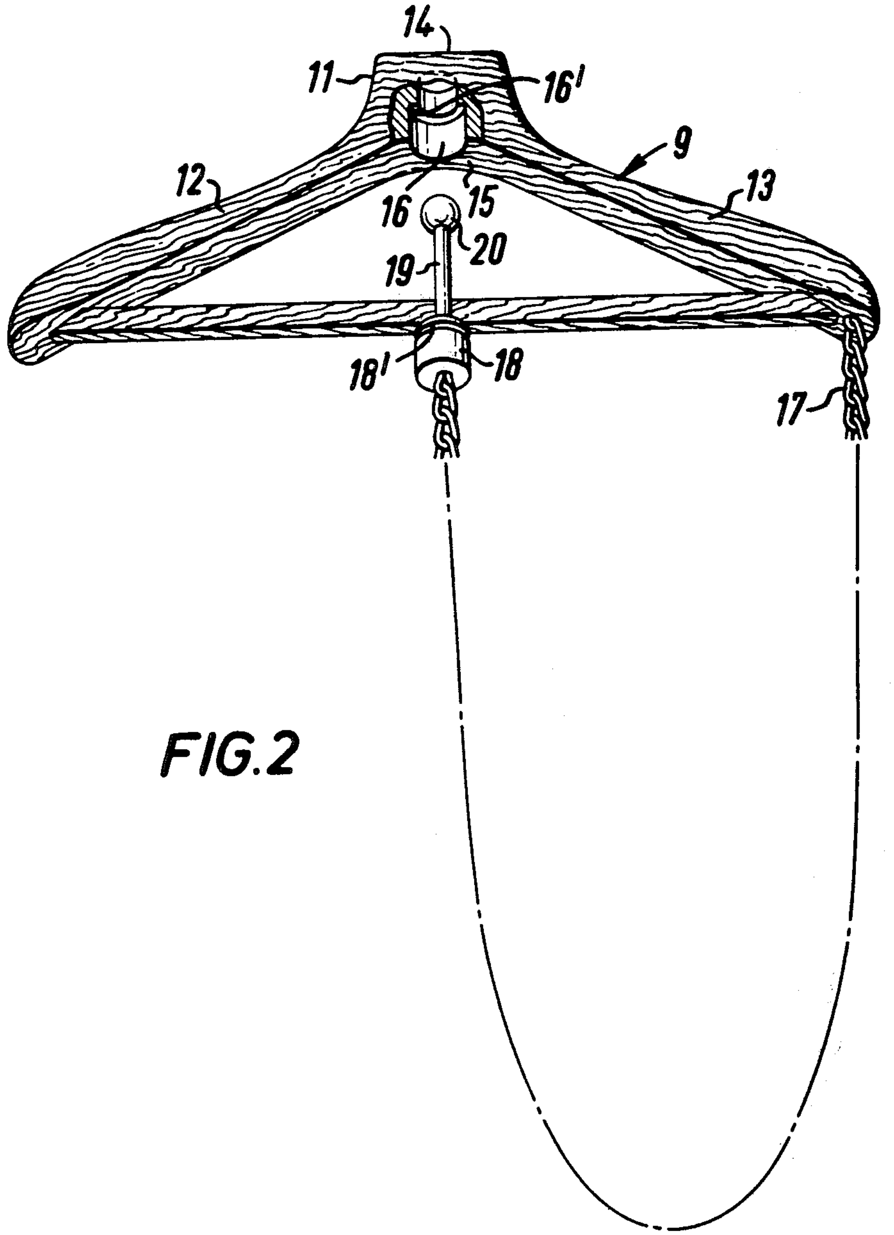
Figure 3:
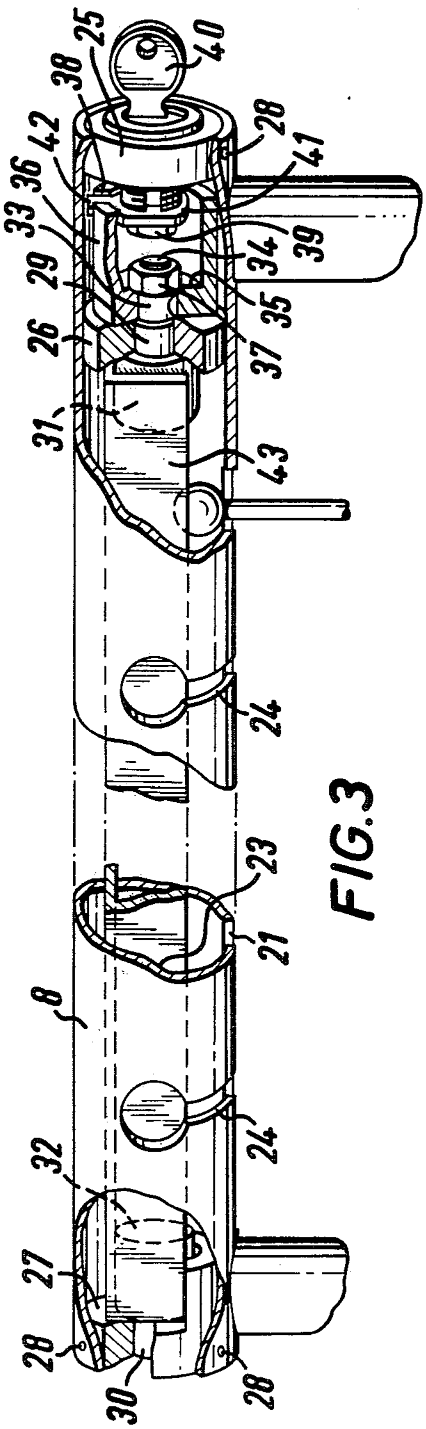
Figure 4:
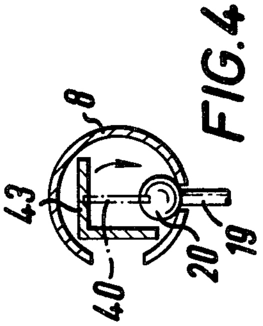
Figure 5:
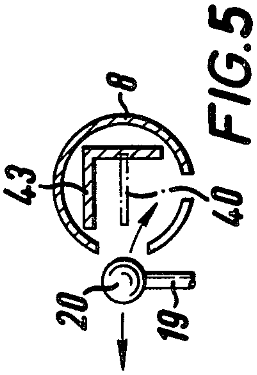
Figure 6:
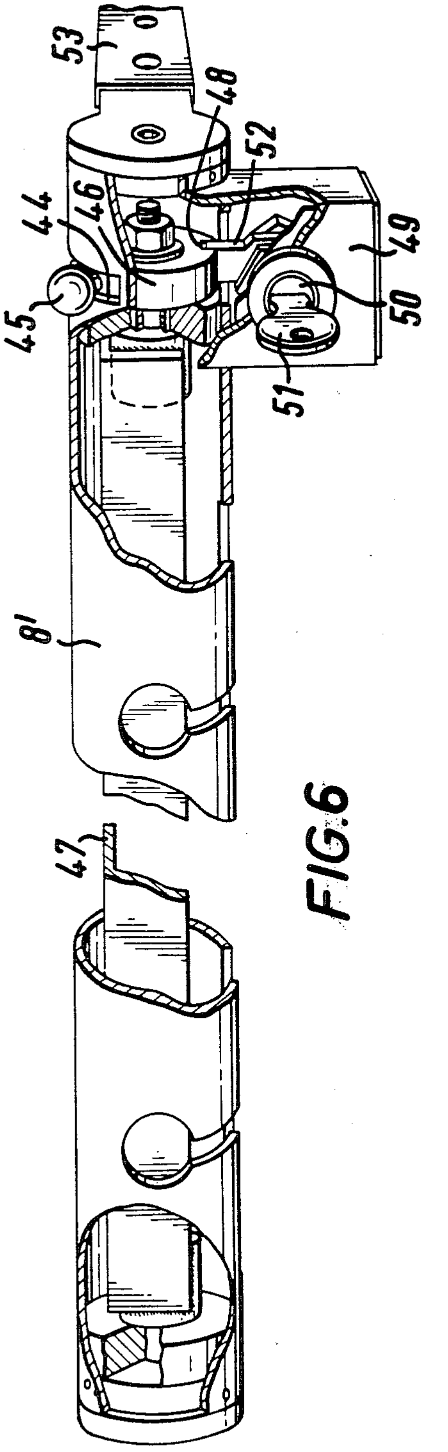
Figure 8:
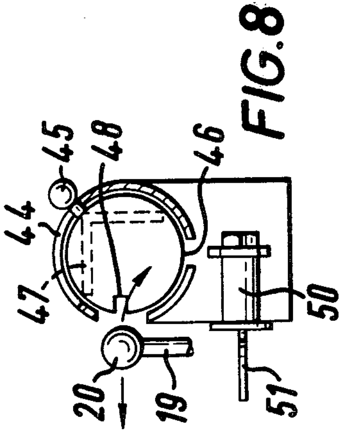
Figure 7:
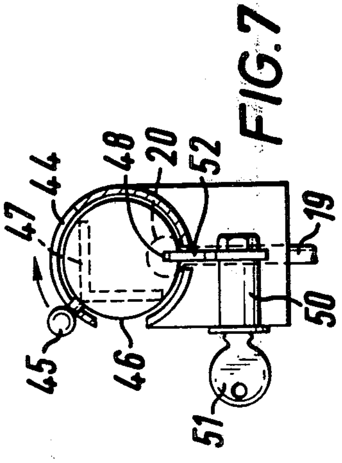
Figure 9:
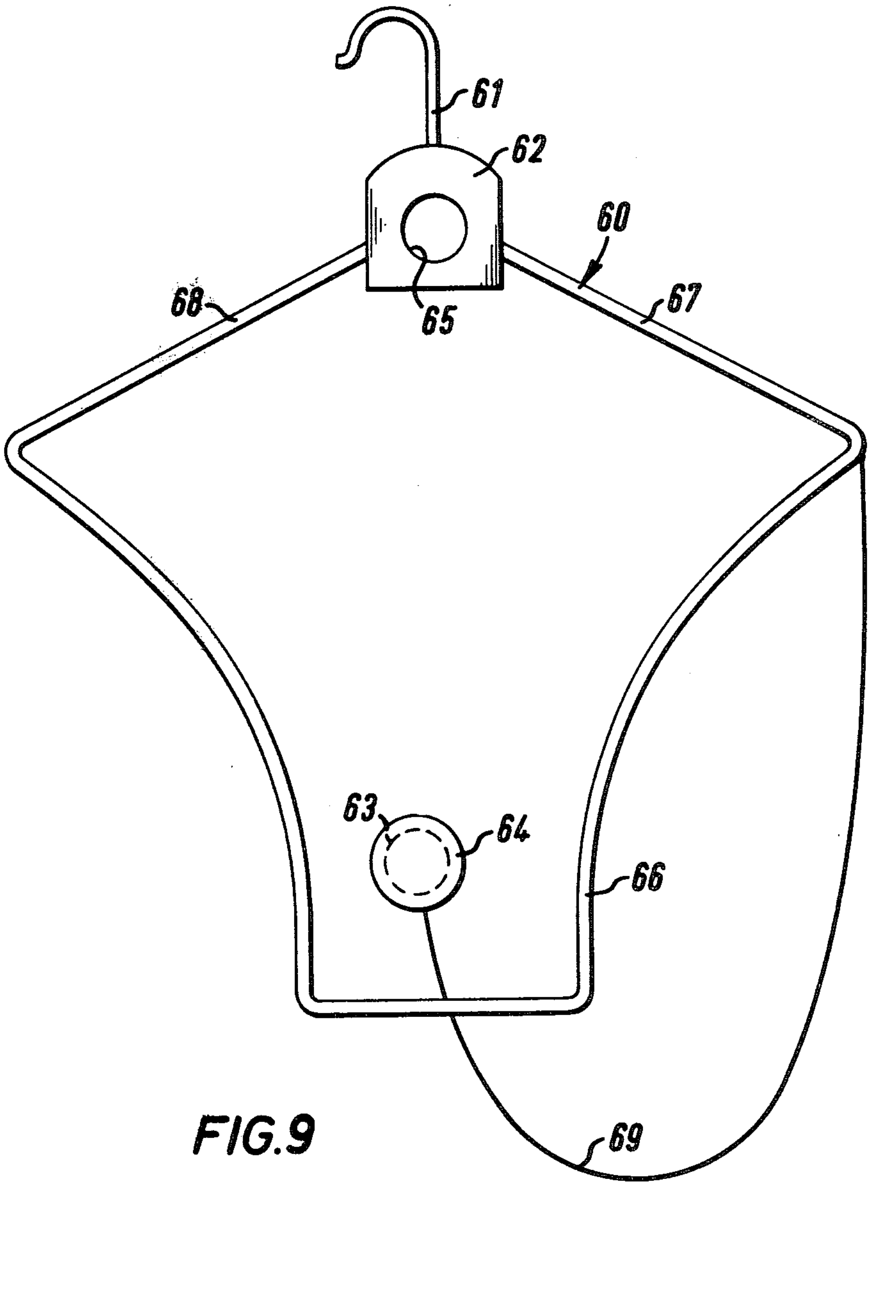

In the drawings:

FIG. 1 is a perspective view of one embodiment of apparatus in accordance with the present invention, FIG. 2 is a diagrammatic representation of a hanger of the apparatus shown in FIG. 1, FIG. 3 is a perspective view, shown partly in cross section, of a cross member of the apparatus shown in FIG. 1, FIG. 4 is a diagrammatic view of the cross member shown in FIG. 3 when the apparatus includes a hanger in a locked position, FIG. 5 is a diagrammatic view similar to FIG. 4 showing the hanger in a removed position from the cross member, FIG. 6 is a perspective view, shown partly in cross section, of a cross member of another embodiment of apparatus in accordance with the present invention, FIG. 7 is a diagrammatic view of the cross member shown in FIG. 6 when the apparatus includes a hanger in a locked position, FIG. 8 is a diagrammatic view similar to FIG. 7 showing the hanger in a removed position from the cross member, and FIG. 9 is a diagrammatic view of another embodiment of apparatus in accordance with the present invention.

Referring now to FIGS. 1 to 5 of the drawings, there is shown a frame 1 comprising two pairs of legs 2, 3 connected by a pair of parallel bars 4, 5. Each pair of legs has upstanding therefrom a post 6, 7, the posts being connected at upper ends thereof by a tubular cross member 8. The cross member 8 is adapted to have suspended therefrom a plurality of hangers 9 for carrying garments, one of which is shown at 10. Each of the hangers 9 has a centre portion 11 and a pair of arms 12 and 13 for supporting a garment 10, the arms extending downwardly of and outwardly from the centre portion 11. The centre portion 11 has an upper surface 14, a lower surface 15 and a bore 16 an upper end of which opens into the upper surface 14 of the centre portion 11 and the bore expanding downwardly into an enlarged lower portion a lower end of which opens into the lower surface 15 of the centre portion 11. The bore 16 has a catch 16' which is urged radially inwardly of the bore 16 by a resilient bias (not shown). The lower outer end of the arm 13 has secured thereto one end of a chain 17. The other end of the chain 17 has secured thereto a cylindrical plug 18. The plug 18 has a circumferential recess 18' and an elongate projection 19, an end portion 20 of the projection remote from the plug being ball-shaped.

When a garment 10 is mounted on a hanger 9 and is supported thereon by the arms 12 and 13, the plug 18 is inserted through an arm of the garment drawing the chain 17 through the arm. The plug 18 then is inserted upwardly into the bore 16 of the centre portion 11 so that the plug 18 is received in the enlarged portion of the bore 16 and is retained therein by the catch 16' which engages in the recess 18' of the plug 18. In this position, the projection 19 of the plug projects through the portion of the bore 16 of reduced diameter with the end portion 20 of the projection 19 extending beyond the upper surface 14 of the centre portion 11. The garment 10 cannot subsequently be removed from the hanger 9 without first pulling the plug 18 downwardly relative to the centre portion 11 thereby disengaging the catch 16' from the recess 18' of the plug and removing the plug 18, including the projection 19 and the end portion 20, from the bore 16.

The cross member 8 of the frame 1 has a central longitudinal slot 21 in a lower portion of the circumferential wall 23 thereof and a plurality of elongate slots 24 spaced longitudinally of the cross member 8 and extending in a circumferential direction of the circumferential wall. The lower end of each slot 24 communicates with the longitudinal slot 21 and the upper end of each slot 24 is of enlarged circular configuration.

The tubular cross member 8 has received therein bushes 25, 26 and 27, the bushes 25 and 27 being at opposite ends of the cross member 8 and being secured to the cross member 8 by means of radially extending pins 28. The bushes 25 and 27 have rotatably mounted therein central portions 29 and 30 of shafts, the shaft having enlarged portions 31 and 32 extending inwardly of the cross member 8 from the bushes 26 and 27. The central portion 29 of the shaft mounted in the bush 26 has an extended portion 33 of reduced diameter extending in an opposite direction from the enlarged portion 31. The extended portion 33 is provided with an external thread 34. The extended portion 33 has received thereon an end wall 35 of a cylindrical member 36, the end wall 35 having an aperture therein through which the extended portion 33 extends. The external thread 34 of the extended portion 33 has screwed thereon a nut 37 so that the end wall 35 of the cylindrical member 36 is secured in abutment with the central portion 29 of the shaft and is therefore rotatable therewith. The cylindrical member 36 is provided with an axial slot 38 extending inwardly from an end thereof remote from the end wall 35.

The bush 25 has rotatably mounted therein a barrel lock 39 which is adapted to be rotated on the central longitudinal axis of the cross member 8 when a key 40 is inserted therein. The barrel lock 39 has keyed thereto inwardly of the bush 25 an annular member 41 having a detent 42 which is received in the slot 38.

The enlarged portions 31 and 32 have welded to the external surfaces thereof opposite ends of a blocking bar 43 of substantially L-shape transverse cross section. The arrangement is such that the blocking bar 43 may be turned on an axis extending longitudinally thereof by inserting the key 40 into the barrel lock 39 and turning the key thereby turning the cylindrical member 36 and thus the shaft having the enlarged portion 31 on which is welded the blocking bar 43. In this manner, the blocking bar 43 may be turned to the position shown in FIG. 4 and alternately tc the position shown in FIG. 5.

In operation, a hanger 9 of the type illustrated in FIGS. 1 and 2 has a garment 10 mounted thereon so that the garment is suspended by the arms 12 and 13 and the chain 17 extends through an arm of the garment thereby retaining the garment on the hanger. The key 40 is then inserted into the barrel lock 39 and turned so that the blocking bar 43 is turned in the cross member 8 to the position shown in FIG. 5. The end portion 20 of the plug 18 projecting beyond the upper surface 14 of the hanger 9 then is inserted through the enlarged circular portion of a slot 24 in the cross member 8 and released. The hanger 9 drops until the ball-shaped end portion 20 is retained on the lower surface of the inner circumferential wall 32 defining the longitudinal slot 21, the projection 19 extending through the slot.

The key 40 then is turned in a reverse direction until the blocking bar 43 is in the position shown in FIG. 4 in which the enlarged circular upper ends of each of the slots 24 are blocked preventing withdrawal of the end portion 20 of the plug 18 of each of the hangers 9 suspended from the cross member 8. The key 40 is then removed from the barrel lock 39.

When it is required to remove a hanger 9 from the cross member 8, the key 40 is inserted into the barrel lock 39 and turned so that the blocking bar 43 is in the position shown in FIG. 5. The hanger 9 then can be removed from the cross member 8 because the ball-shaped end portion 20 of the plug 18 of the hanger can be withdrawn through an enlarged circular end portion of an adjacent slot 24.

After the hanger 9 has been withdrawn from the cross member 8, the key 40 is again turned to the initial position shown in FIG. 4 and removed from the barrel lock 39 whereby the blocking bar 43 is locked in the initial position.

Referring now to FIGS. 6 to 8 of the drawings, there is shown a tubular cross member 8' similar to the tubular cross member 8 in the embodiment illustrated in FIGS. 1 to 5. The cross member 8' differs from the cross member 8 in that the cross member 8' is provided with a circumferential arcuate slot 44. The slot 44 has extending therethrough a lever 45 secured to a cylindrical member 46, similar to the cylindrical member 36 contained in the cross member 8, for turning a blocking bar 47. The cylindrical member 46 is provided with a radial recess 48. The cross member 8' is provided with a depending housing 49 in which is rotatably mounted a barrel lock 50 rotatable on insertion therein of a key 51. The barrel lock 50 has secured thereto so as to extend radially therefrom a detent 52 adapted to engage in the recess 48 of the cylindrical member 46 when the lever 45 is in the position shown in FIGS. 6 and 7.

In operation, the cylindrical member 46 is released by inserting the key 51 into the barrel lock 50 and turning the key so that the detent 52 is moved out of the recess 48. The lever 45 then is moved to turn the blocking bar 47 to the position shown in FIG. 8. A hanger 9 can then be removed from or located on the cross member 8', as indicated by the arrows in FIG. 8. The lever 45 then is returned to the position shown in FIG. 7, in which removal of hangers 9 from the cross member 8' is prevented by the blocking bar 47, and the key 51 is turned to the position shown in FIGS. 6 and 7 in which the detent 52 is in engagement the recess 48, and the key 51 is withdrawn from the barrel lock 50. The lever 45 cannot then be moved to turn the blocking bar 47 until the key 51 is reinserted into the barrel lock 50 and turned.

It will be appreciated that the cross members 8 and 8' may be mounted on a free standing frame 1 or they may be connected to wall brackets, as shown at 53 in FIG. 6.

Referring now to FIG. 9 of the drawings, there is shown a hanger 60 having a hook 61 extending upwardly from a boss 62 and a locking device 63 on a plug 64, the locking device 63 being adapted to co-operate with a recess 65 in the boss 62. The hanger 60 also has a frame 66 integral with arms 67 and 68 for supporting a garment and the plug 64 is secured to one end of a chain 69 the other end of the chain being secured to one of the arms 67 or 68.

In use, the hanger 60 can be hung on a support member of a conventional display frame by means of the hook 61. However, a garment can be retained on the hanger 60 by threading the plug 64 through an aperture, such as an arm-hole, of a garment suspended on the arms 67 and 68 of the hanger and locking the locking device 63 in the recess 65 in the boss 62.

It is intended that the hanger 60 will be used for garments which are to be sold in retail establishments in which customers are invited to remove garments from display frames for inspection of the garments and to replace them on the display frames if not wishing to purchase the garments. The frame 66 of the hanger 60 is of such dimensions that a garment retained on the hanger 60 cannot be inserted fully into a shopping bag because the frame 66 is larger than the height and/or width of the bag. In normal usage, the plug 64 would be unlocked by a shop assistant after a customer had paid for a garment and the garment would be removed from the hanger and given to the customer, the hanger being retained by the shop assistant for further use.

It will be appreciated that each of the hangers 9 and 60 has its own security device for retaining a garment thereon, the security device being in the form of a chain which can be threaded through an aperture of the garment and the ends of which are secured to the hanger in order to retain the garment on the hanger.

It will also be appreciated that additional security devices may be provided. One such additional device is an alarm system wherein a feeler device may be provided on a display frame so that a portion of the feeler device contacts a surface supporting the display frame. The arrangement is such that movement of the frame, or a portion of the frame bearing the feeler device, relative to the supporting surface will cause the alarm to operate due to the movement causing deflection of the feeler device.

What we claim is:

1. Apparatus for hanging an article having an aperture therein, the apparatus comprising:

a carrier for carrying the article, said carrier having an aperture therein;

an elongate flexible member suspended at an end portion thereof from said carrier;

a plug secured to an end portion of said flexible member remote from said one end portion thereof, said plug having abutment means and said plug being adapted to be inserted in said carrier aperture so that said abutment means extends from said carrier;

a support member for suspending said carrier therefrom, said support member having a recess adapted to receive therein said abutment means of said plug, and means movable relative to said support member to prevent withdrawal of said abutment means from said support member, whereby an article located on said carrier may be carried thereon when said flexible member is threaded through the aperture of said article and said plug is inserted in said aperture of said carrier and said carrier is suspended from said support member with said abutment means received in said recess;

said support member comprising a tube, said recess comprising a slot extending in a circumferential direction of said tube and said movable means comprising a blocking member extending longitudinally of said tube and past said recess and shaped so that, when moved to a first position, said blocking member blocks withdrawl of said abutment means from said slot, and when moved to a second position, said blocking members does not block withdrawl of said abutment means from said slot; and said blocking member being pivotally mounted in said tube on an axis extending longitudinally thereof for being pivotable between its said first and second positions.

2. Apparatus as claimed in claim 1 wherein said support member is mounted on a stand.

3. Apparatus as claimed in claim 1 wherein said support member comprises a plurality of said recesses; said blocking member being elongate and extending past said recesses.

4. Apparatus as claimed in either of claims 1 or 3, further comprising control means connected with said blocking member for rotating said blocking member.

5. Apparatus as claimed in claim 4 wherein said control means comprises a lock mechanism adapted to receive a key and said lock mechanism being movable between a first position blocking rotation of said blocking member and a second position permitting such rotation; said lock mechanism being normally in said first position thereof and being adapted to be moved to said second position upon insertion of a key, whereby rotation of said blocking member on said axis can be effected only after insertion of said key in said lock mechanism.

6. Apparatus as claimed in claim 5 wherein said lock mechanism is adapted such that said blocking member is rotated on said axis when said key in said lock mechanism is rotated relative to said lock mechanism.

7. Apparatus as claimed in claim 5 wherein said lock mechanism comprises an abutment member and a cooperating detent, wherein said detent is adapted to engage said abutment member to restrain rotation of said lock mechanism when said key in said lock mechanism is rotated relative to said lock mechanism.

8. Apparatus according to claim 1 wherein the blocking member is provided with a lever for pivoting the blocking member on the said axis.

* * * * *